United States Patent
Han et al.

(10) Patent No.: US 9,769,467 B2
(45) Date of Patent: Sep. 19, 2017

(54) 3D DISPLAY DEVICE FOR DISPLAYING 3D IMAGE USING AT LEAST ONE OF GAZE DIRECTION OF USER OR GRAVITY DIRECTION

(71) Applicant: Samsung Electronics Co., Ltd., Suwon-si (KR)

(72) Inventors: Jae Joon Han, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 666 days.

(21) Appl. No.: 14/027,525

(22) Filed: Sep. 16, 2013

(65) Prior Publication Data
US 2014/0168389 A1     Jun. 19, 2014

(30) Foreign Application Priority Data
Dec. 18, 2012  (KR) .................. 10-2012-0148615

(51) Int. Cl.
*H04N 13/04*     (2006.01)
*G06F 3/01*      (2006.01)

(52) U.S. Cl.
CPC ......... *H04N 13/0484* (2013.01); *G06F 3/013* (2013.01); *H04N 13/0402* (2013.01)

(58) Field of Classification Search
None
See application file for complete search history.

(56) References Cited

U.S. PATENT DOCUMENTS

| 8,922,480 | B1 * | 12/2014 | Freed ................. G09G 5/00 345/156 |
| 2006/0038880 | A1 | 2/2006 | Starkweather et al. |
| 2012/0083312 | A1 * | 4/2012 | Kim ................. G02B 13/001 455/556.1 |
| 2012/0105589 | A1 | 5/2012 | Thörn |

(Continued)

FOREIGN PATENT DOCUMENTS

| CA | EP 1884864 A1 * | 2/2008 | ........... G06F 1/1626 |
| EP | 1 884 864 A1 | 2/2008 | |

(Continued)

OTHER PUBLICATIONS

Pastoor, S., et al., "17.5: Invited Paper: Autostereoscopic User-Computer Interface with Visually Controlled Interaction", Proceedings from the SID International Symposium Digest of Technical Papers (SID '97), May 1997, pp. 277-280.

(Continued)

*Primary Examiner* — James M Anderson, II
(74) *Attorney, Agent, or Firm* — NSIP Law

(57) ABSTRACT

A three-dimensional (3D) display device for displaying a 3D image using at least one of a gaze direction of a user and a gravity direction includes a gaze direction measuring unit to measure the gaze direction, a data obtaining unit to obtain 3D image data for the 3D image, a viewpoint information obtaining unit to obtain information relating to a viewpoint of the 3D image, a data transform unit to transform the 3D image data, based on the gaze direction and the information relating to the viewpoint of the 3D image, and a display unit to display the 3D image, based on the transformed 3D image data.

14 Claims, 12 Drawing Sheets

(56) References Cited

U.S. PATENT DOCUMENTS

| | | | |
|---|---|---|---|
| 2012/0200680 A1* | 8/2012 | So | H04N 13/0413 |
| | | | 348/54 |
| 2012/0229516 A1* | 9/2012 | Matsunaga | A63F 13/06 |
| | | | 345/659 |
| 2012/0300046 A1 | 11/2012 | Blayvas | |
| 2013/0016102 A1* | 1/2013 | Look | G06T 15/20 |
| | | | 345/426 |

FOREIGN PATENT DOCUMENTS

| | | |
|---|---|---|
| JP | 2009-251141 | 10/2009 |
| JP | 2011-70341 | 4/2011 |
| KR | 10-2000-0049011 | 7/2000 |
| KR | 10-2007-0046448 | 5/2007 |
| KR | 10-2007-0052260 | 5/2007 |
| KR | 10-2007-0076304 | 7/2007 |
| KR | 10-2008-0069579 | 7/2008 |
| KR | 10-2010-0048747 | 5/2010 |
| KR | 10-2011-0070326 | 6/2011 |
| KR | 10-2012-0023247 | 3/2012 |

OTHER PUBLICATIONS

Pastoor, S., et al., "An Experimental Multimedia System Allowing 3-D Visualization and Eye-Controlled Interaction Without User-Worn Devices", IEEE Transactions on Multimedia, vol. 1, No. 1, Mar. 1999, pp. 41-52.

Extended European Search Report dated Oct. 21, 2014, in counterpart European Application No. 13198140.9 (11 pages, in English).

\* cited by examiner

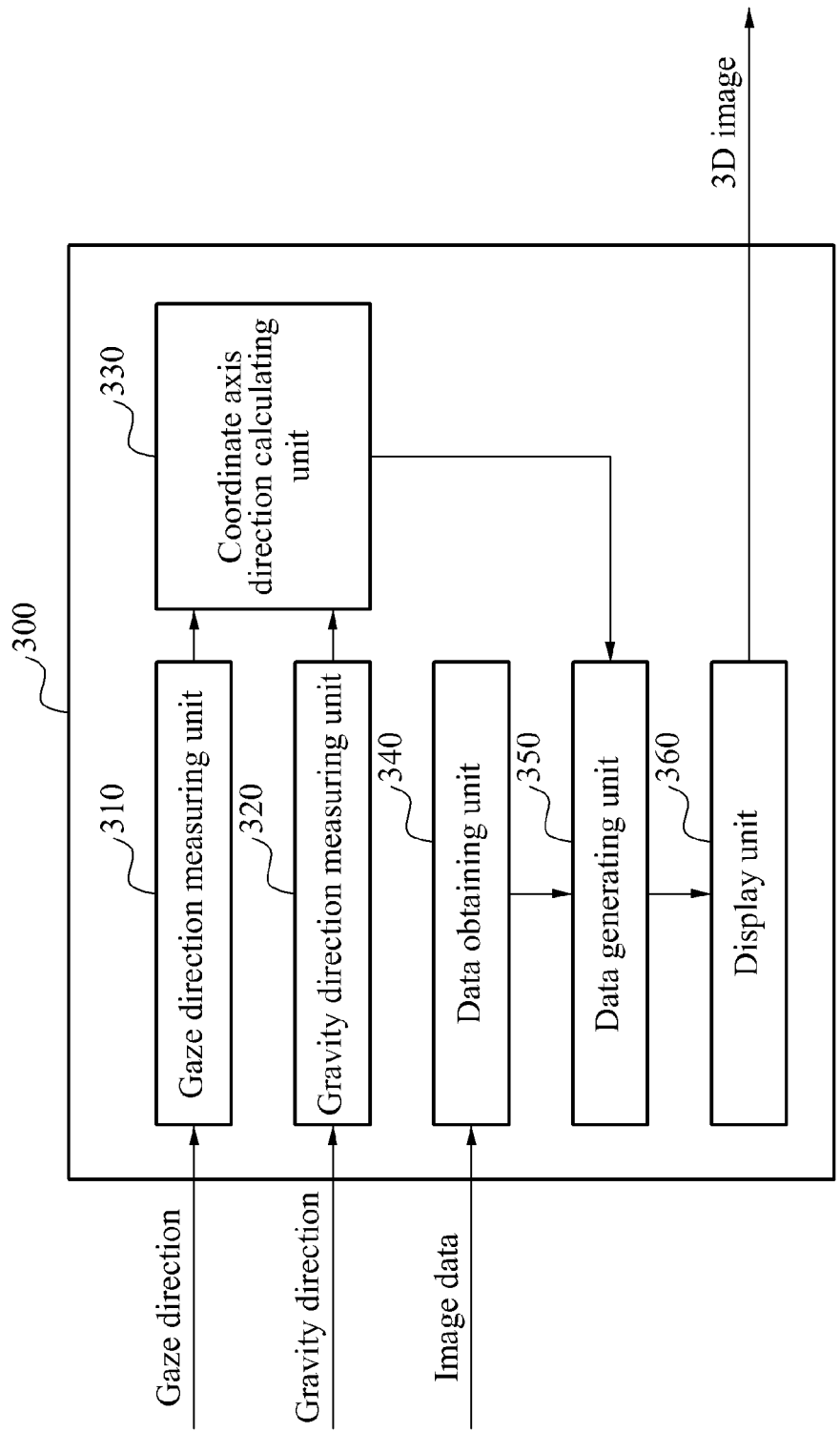

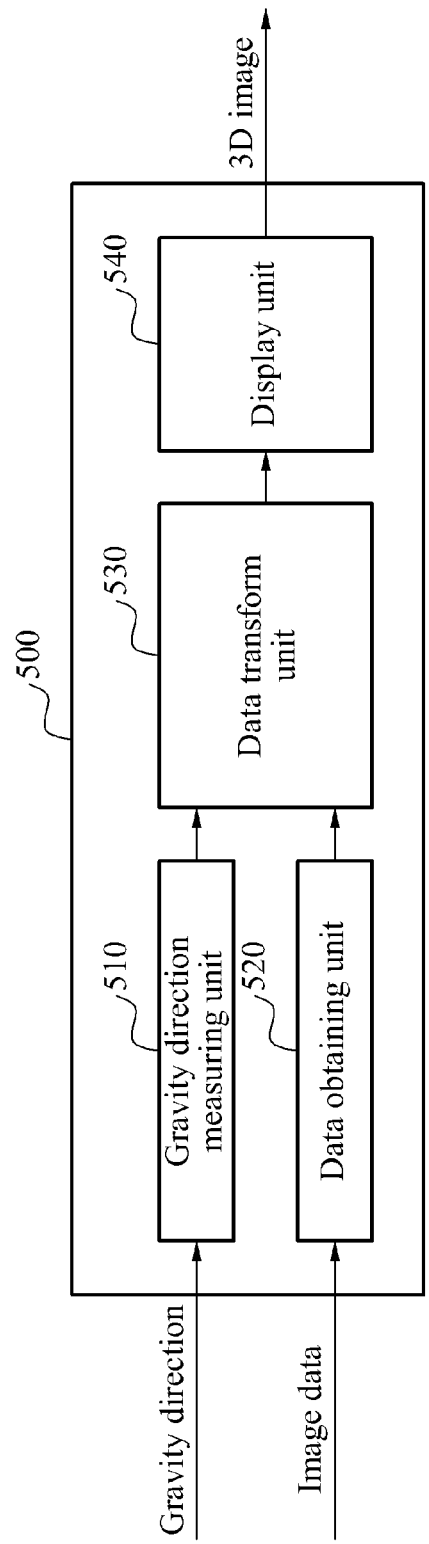

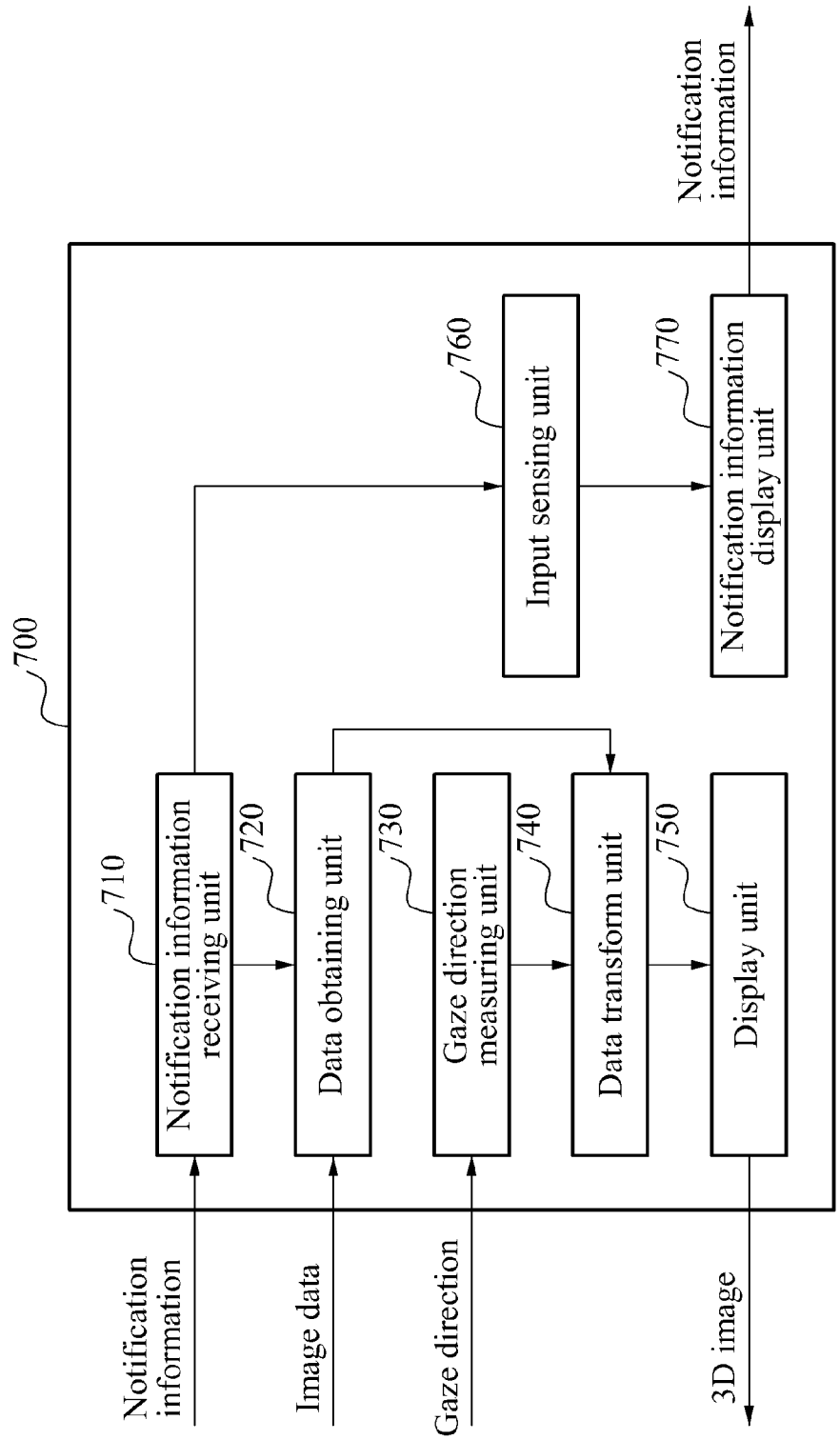

3D DISPLAY DEVICE FOR DISPLAYING 3D IMAGE USING AT LEAST ONE OF GAZE DIRECTION OF USER OR GRAVITY DIRECTION

CROSS-REFERENCE TO RELATED APPLICATIONS

This application claims the priority benefit of Korean Patent Application No. 10-2012-0148615, filed on Dec. 18, 2012, in the Korean Intellectual Property Office, the disclosure of which is incorporated herein by reference.

BACKGROUND

1. Field

The following description relates to a three-dimensional (3D) display device that may display a 3D image using at least one of a gaze direction of a user or a gravity direction.

2. Description of the Related Art

Recently, a 3D display device for displaying 3D images has been commercialized. The 3D display device is utilized in homes, offices, and commercial fields, and the use of the 3D display device is expanding to various fields such as medical institutions or military organizations, for example.

The 3D display device may display a volume-rendered object in a 3D space. In this instance, the 3D display device may display a 3D image, based on a local reference frame of the 3D display device.

SUMMARY

A display device may display a 3D image to be viewed by a user. A predetermined viewpoint may be associated with the 3D image to define a direction in which the 3D image should be viewed. A user views the 3D image from a particular direction. The display device may rotate the 3D image so that the predetermined viewpoint of the image correlates with the view direction of the user. If the display device moves, the 3D image may be updated to maintain the correlation. Accordingly, the user may continually view a front view of a 3D image whether or not the display device is stationary, for example.

The foregoing and/or other aspects are achieved by providing a three-dimensional (3D) display device for displaying a 3D image using a gaze direction of a user, the device including a gaze direction measuring unit to measure the gaze direction, a data obtaining unit to obtain 3D image data for the 3D image, a viewpoint information obtaining unit to obtain information relating to a viewpoint of the 3D image, a data transform unit to transform the 3D image data, based on the measured gaze direction and the information relating to the viewpoint of the 3D image, and a display unit to display the 3D image, based on the transformed 3D image data.

The information relating to the viewpoint of the 3D image may include a viewpoint direction in which the 3D image is set to be viewed by the user, and the data transform unit may transform the 3D image data for the gaze direction to correspond to the viewpoint direction.

The foregoing and/or other aspects are achieved by providing a 3D display device for displaying a 3D plane image using a gaze direction of a user, the device including a gaze direction measuring unit to measure the gaze direction, a gravity direction measuring unit to measure a gravity direction, a data obtaining unit to obtain two-dimensional (2D) image data for the 3D plane image, a coordinate axis direction calculating unit to calculate a coordinate axis direction of a 3D plane for displaying the 3D plane image, based on the gaze direction and the gravity direction, a data generating unit to generate 3D plane image data, based on the 2D image data and the coordinate axis direction, and a display unit to display the 3D plane image, based on the 3D plane image data.

The foregoing and/or other aspects are achieved by providing a 3D display device for displaying a 3D image including new notification information using a gaze direction of a user, the device including a notification information receiving unit to receive the new notification information, a data obtaining unit to obtain 3D image data corresponding to the new notification information, a gaze direction measuring unit to measure the gaze direction, a data transform unit to transform the 3D image data, based on the measured gaze direction, a display unit to display the 3D image, based on the transformed 3D image data, an input sensing unit to sense an input from the user, the input associated with the new notification information, and a notification information display unit to display the new notification information when the input from the user is sensed by the input sensing unit.

The foregoing and/or other aspects are achieved by providing a 3D display device for displaying a 3D image using a gravity direction, the device including a gravity direction measuring unit to measure the gravity direction, a data obtaining unit to obtain image data for the 3D image, a data transform unit to transform the image data for a direction of a single axis predetermined from among coordinate axes of the 3D image to correspond to the gravity direction, and a display unit to display the 3D image, based on the transformed image data.

The device may further include a first axis direction measuring unit to measure a predetermined first axis direction included in 3D coordinate axes of the 3D display device, and the data transform unit may transform the image data for directions of two axes predetermined from among the coordinate axes of the 3D image to correspond to the gravity direction and the first axes direction, respectively.

The device may further include a gaze direction measuring unit to measure a gaze direction of a user, a 2D image display unit to display a 2D image, a normal direction measuring unit to measure a normal direction of the 2D image display unit, and a control unit to control the 2D image display unit to display the 2D image based on the gaze direction and the normal direction.

The foregoing and/or other aspects are achieved by providing a 3D display device for displaying a 3D image using a gaze direction of a user, the device including a gaze direction measuring unit to measure the gaze direction, a gravity direction measuring unit to measure a gravity direction, and a coordinate axis direction calculating unit to calculate a 3D coordinate axis direction for displaying the 3D image, based on the gaze direction and the gravity direction.

The foregoing and/or other aspects are achieved by providing a method for displaying a three-dimensional (3D) image on a display device using a gaze direction of a user including: measuring the gaze direction; obtaining 3D image data for the 3D image; obtaining information relating to a viewpoint of the 3D image; transforming, by a processor, the 3D image data, based on the measured gaze direction and the information relating to the viewpoint of the 3D image; and displaying the 3D image, based on the transformed 3D image data.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 3 illustrates a 3D display device for displaying a 3D plane image using a gaze direction of a user according to example embodiments;

FIG. 5 illustrates a 3D display device for displaying a 3D image using a gravity direction according to example embodiments;

FIG. 7 illustrates a 3D display device for displaying a 3D image including new notification information using a gaze direction of a user according to example embodiments.

DETAILED DESCRIPTION

Figure 1:
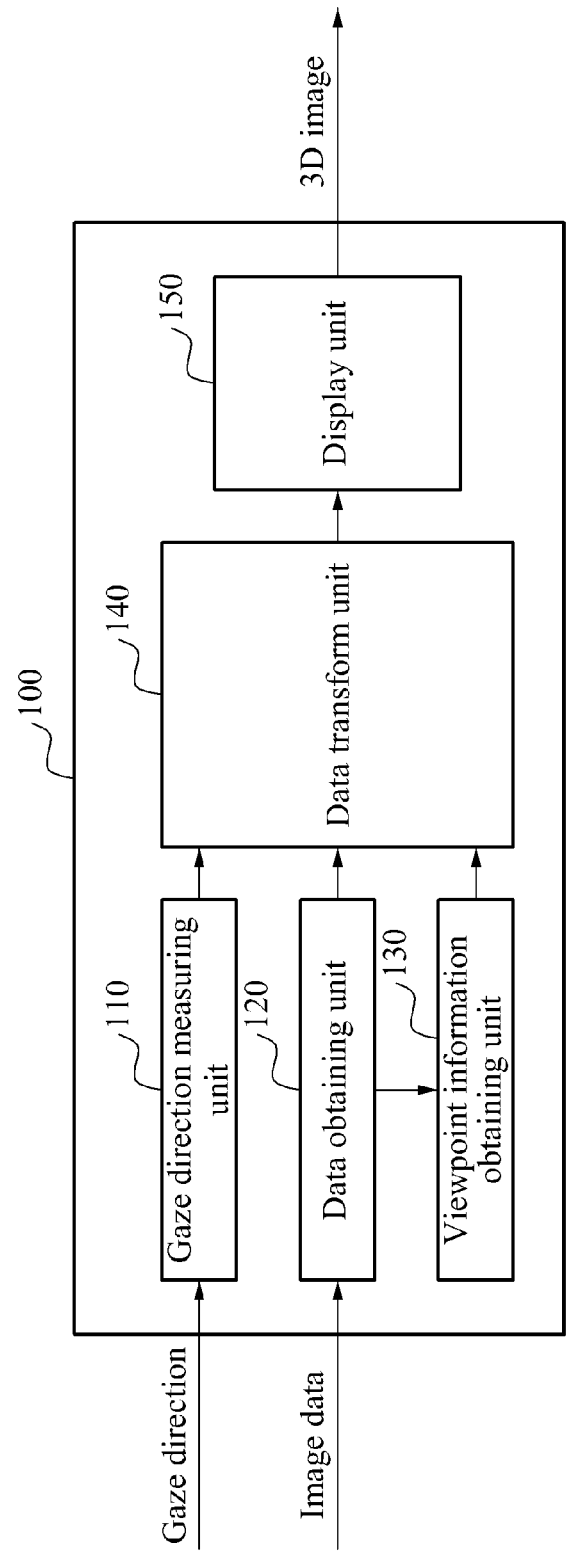
FIG. 1 illustrates a three-dimensional (3D) display device for displaying a 3D image using a gaze direction of a user according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a three-dimensional (3D) display device 100 for displaying a 3D image using a gaze direction of a user according to example embodiments.

Referring to FIG. 1, the 3D display device 100 may include a gaze direction measuring unit 110, a data obtaining unit 120, a viewpoint information obtaining unit 130, a data transform unit 140, and a display unit 150. Here, the 3D display device 100 may refer to a device displaying a 3D image to a user, and may be implemented in various forms, such as a fixed device or a portable device, for example.

The gaze direction measuring unit 110 may measure a gaze direction of a user. Here, the gaze direction may refer to a direction in which the user views, or gazes at, a 3D image displayed by the 3D display device 100. The gaze direction measuring unit 110 may employ various schemes for measuring, or determining, the gaze direction of the user. For example, the gaze direction measuring unit 110 may measure the gaze direction of the user based on an image relating to the user or audio relating to the user.

The data obtaining unit 120 may obtain 3D image data for the 3D image. Here, the 3D image may refer to an image displayed in a 3D space by the 3D display device 100, and may include a 3D hologram, for example. The 3D image data may refer to data including information relating to the 3D image, and may include data of a predetermined format that may be processed by a predetermined graphic processing unit (GPU), for example.

The viewpoint information obtaining unit 130 may obtain information relating to a viewpoint of the 3D image. Here, the 3D image may be displayed in the 3D space and thus, the user may gaze at the 3D image from many positions. In this instance, the plurality of positions from which the user gazes at the 3D image may match a plurality of viewpoints, respectively.

The viewpoint of the 3D image data may correspond to one of the plurality of viewpoints from which the user may gaze, as mentioned above. The viewpoint information obtaining unit 130 may obtain information relating to such a viewpoint.

For example, the information relating to the viewpoint of the 3D image may include a viewpoint direction in which the 3D image is set to be viewed by the user. In this instance, the viewpoint direction may be predetermined to be a direction most suitable for displaying the 3D image to the user. Further, the viewpoint direction may be changed based on various algorithms, such as an input from the user, or time duration, for example.

The data transform unit 140 may transform the 3D image data obtained by the data obtaining unit 120, based on the information relating to the viewpoint obtained by the viewpoint information obtaining unit 130 and the gaze direction measured by the gaze direction measuring unit 110.

For example, the data transform unit 140 may transform the 3D image data for the gaze direction to correspond to the viewpoint direction.

The display unit 150 may display the 3D image, based on the 3D image data transformed by the data transform unit 140. Here, the display unit 150 may display the 3D image in a predetermined 3D image display space.

Accordingly, the 3D display device 100 may generate a 3D image based on the gaze direction of the user, irrespective of an orientation of the 3D display device 100.

The 3D display device 100 may provide technology for providing a steady, uniform 3D image based on a gaze of the user, in varied environments in which a screen may shake, such as when the user walks or when the user is on the bus, for example.

According to example embodiments, the 3D display device 100 may further include an image acquiring unit (not shown) to acquire an image relating to the user. In this instance, the gaze direction measuring unit 110 may measure the gaze direction of the user, by estimating positions of eyes of the user from the image relating to the user acquired by the image acquiring unit.

According to example embodiments, the 3D display device 100 may further include an audio acquiring unit (not shown) to acquire an audio relating to the user. In this instance, the gaze direction measuring unit 110 may estimate at least one of a position or a direction of the user from audio acquired by the audio acquiring unit, in order to measure the gaze direction.

In particular, the audio acquiring unit may include at least two microphones. The gaze direction measuring unit 110 may estimate the direction of the user based on audio acquired by two microphones, respectively, or estimate the position of the user based on audio acquired by three microphones, respectively. Here, the direction of the user may include a relative direction from the 3D display device 100, and the position of the user may include a relative position from the 3D display device 100.

According to example embodiments, the 3D display device 100 may implement the data transform unit 140, using a coordinate axis transformation.

For example, the data transform unit 140 may calculate new coordinate axes for displaying the 3D image, by performing an affine transformation with respect to coordinate axes of the 3D display device 100, using Equation 1.

$$\begin{bmatrix} X' \\ Y' \\ Z' \\ 1 \end{bmatrix} = \begin{bmatrix} a & b & c & x \\ d & e & f & y \\ g & h & i & z \\ 0 & 0 & 0 & 1 \end{bmatrix} \begin{bmatrix} X \\ Y \\ Z \\ 1 \end{bmatrix} \quad \text{[Equation 1]}$$

In Equation 1, (X, Y, Z) denotes coordinate axes of the 3D display device 100, and (X', Y', Z') denotes transformed coordinate axes. In addition, (a, b, c) denotes a value expressing an X' axis based on an X axis, a Y axis, and a Z axis, (d, e, f) denotes a value expressing a Y' axis based on the X axis, the Y axis, and the Z axis, and (g, h, i) denotes a value expressing a Z' axis based on the X axis, the Y axis, and the Z axis. (x, y, z) denotes a value translated based on 3D coordinates corresponding to the origin.

Figure 2A:
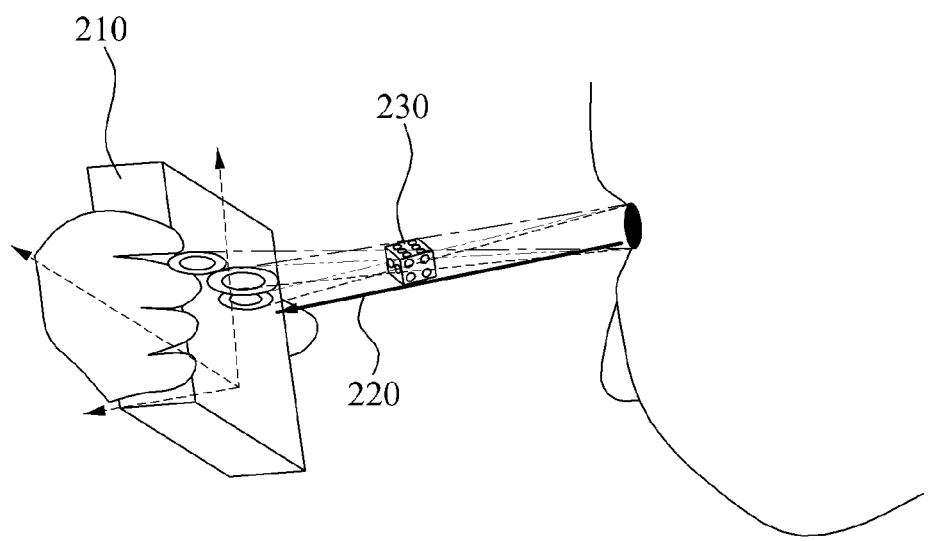
FIGS. 2A and 2B illustrate an operation of a 3D display device for displaying a 3D image using a gaze direction of a user according to example embodiments.
Figure 2B:
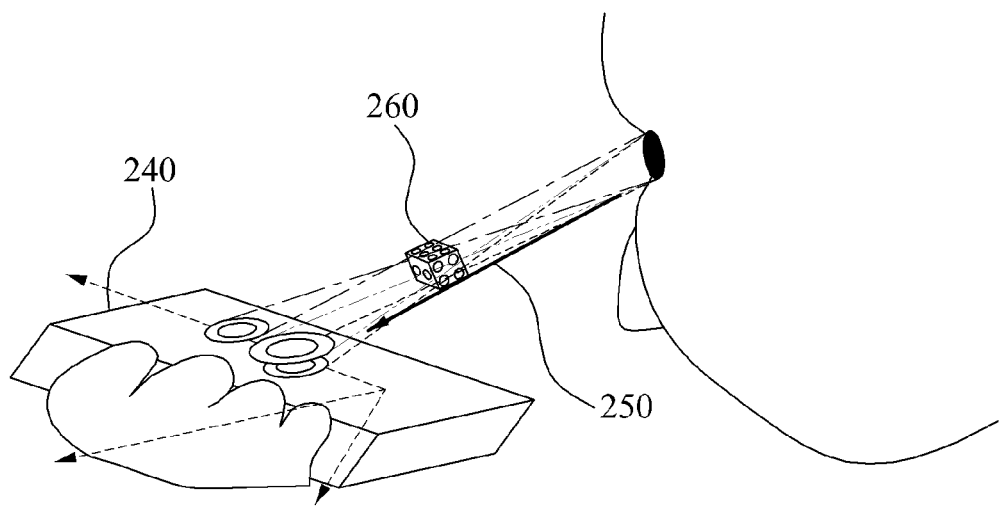

FIGS. 2A and 2B illustrate an operation of a 3D display device for displaying a 3D image using a gaze direction of a user according to example embodiments.

Referring to FIG. 2A, a 3D display device 210 may measure a gaze direction 220 of a user. The 3D display device 210 may display a 3D image 230 for a set, or predetermined, viewpoint direction to correspond to the gaze direction 220 of the user such that the user may view the 3D image 230.

Referring to FIG. 2B, an orientation of a 3D display device 240 may be changed. For example, the user may view a 3D image 260 while walking and carrying a smart phone including the 3D display device 240. In this instance, the orientation of the 3D display device 240 may be changed by a movement, or a shock, for example, occurring while the user is walking.

The 3D display device 240 may continuously track a gaze direction 250 of the user. Furthermore, the 3D display device 240 may continuously change 3D image data for a set viewpoint direction to correspond to the gaze direction 250 of the user such that the user may view the 3D image 260.

Accordingly, the user may be provided with a steady, uniform 3D image based on a gaze of the user even when the 3D display device 240 shakes.

FIG. 3 illustrates a 3D display device 300 for displaying a 3D plane image using a gaze direction of a user according to example embodiments. Here, the 3D plane image may refer to an image displayed in a form of a plane in a 3D space, and the 3D display device 300 may control the 3D plane image using the gaze direction of the user.

Referring to FIG. 3, the 3D display device 300 may include a gaze direction measuring unit 310, a gravity direction measuring unit 320, a coordinate axis direction calculating unit 330, a data obtaining unit 340, a data generating unit 350, and a display unit 360.

The gaze direction measuring unit 310 may measure the gaze direction of the user. The description provided with reference to FIG. 1 through FIG. 2B also applies to the gaze direction measuring unit 310 and thus, a further detailed description will be omitted for conciseness.

The gravity direction measuring unit 320 may measure a gravity direction, and the coordinate axis direction calculating unit 330 may calculate a coordinate axis direction of a 3D plane for displaying the 3D plane image, based on the gaze direction measured by the gaze direction measuring unit and the gravity direction measured by the gravity direction measuring unit 320.

For example, the coordinate axis direction calculating unit 330 may generate a 3D plane orthogonal to the gaze direction. In particular, as expressed by Equation 2, the coordinate axis direction calculating unit 330 may calculate an x axis direction of the 3D plane, using a cross product of a vector of the gravity direction and a vector of the gaze direction. Furthermore, the coordinate axis direction calculating unit 330 may calculate a y axis direction of the 3D plane, using a cross product of a vector of the calculated x axis direction and the vector of the gaze direction.

$$\vec{X} = \vec{g} \times \vec{G}\text{aze}$$

$$\vec{Y} = \vec{X} \times \vec{G}\text{aze} \quad \text{[Equation 2]}$$

In Equation 2, $\vec{X}$, $\vec{Y}$, $\vec{g}$, and $\vec{G}$aze denote a vector of the x axis direction, a vector of the y axis direction, a vector of the gravity direction, and a vector of the gaze direction, respectively. $\hat{\times}$ denotes a cross product operation of vectors.

According to example embodiments, the coordinate axis direction calculating unit 330 may set the y axis direction of the 3D plane to the gravity direction. In this instance, the coordinate axis direction calculating unit 330 may calculate the x axis direction of the 3D plane, using a cross product of the vector of the gravity direction and the vector of the gaze direction.

The data obtaining unit 340 may obtain two-dimensional (2D) image data for the 3D plane image. Here, the 2D image data may refer to data including information relating to the 3D plane image, and may include data of a predetermined format that may be processed by a predetermined GPU, for example.

The data generating unit 350 may generate 3D plane image data, based on the 2D image data obtained by the data obtaining unit 340 and the coordinate axis direction of the 3D plane calculated by the coordinate axis direction calculating unit 330. Here, the 3D plane image data may include image data that displays the 2D image data on a 3D plane.

The display unit 360 may display the 3D plane image, based on the 3D plane image data generated by the data generating unit 350.

Accordingly, the 3D display device 300 may provide technology for enabling the user to view a front of a 2D image at all times. Further, the 3D display device 300 may provide a steady, uniform 3D plane image based on a gaze of the user although an orientation of the 3D display device 300 or a gaze direction of the user is changed.

Although not shown in FIG. 3, according to example embodiments, the 3D display device 300 may calculate a 3D coordinate axis direction for displaying a 3D image, based on the gaze direction and the gravity direction.

For example, the 3D display device 300 may calculate an x axis direction of a 3D coordinate axis, using a cross product of the vector of the gravity direction and the vector of the gaze direction. Further, the 3D display device 300 may calculate a y axis direction of the 3D coordinate axis, using a cross product of a vector of the calculated x axis direction and the vector of the gaze direction, or may set the y axis direction of the 3D coordinate axis to the gravity direction. In this instance, the 3D display device 300 may set a z axis direction of the 3D coordinate axis to the gaze direction.

Here, the 3D display device 300 may obtain 3D image data, and transform the obtained 3D image data based on the 3D coordinate axis direction.

Figure 4A:
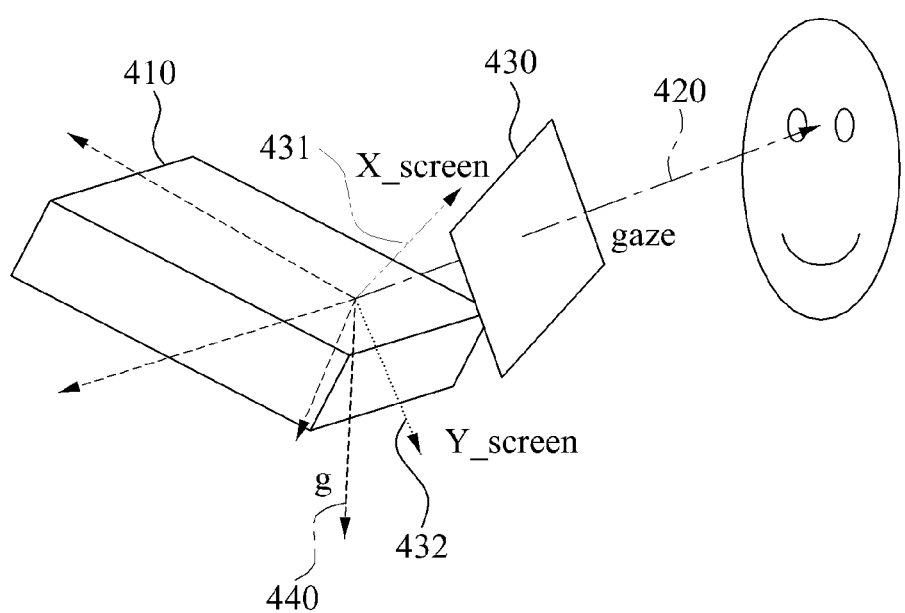
FIGS. 4A and 4B illustrate an operation of a 3D display device for displaying a 3D plane image using a gaze direction of a user according to example embodiments.
Figure 4B:
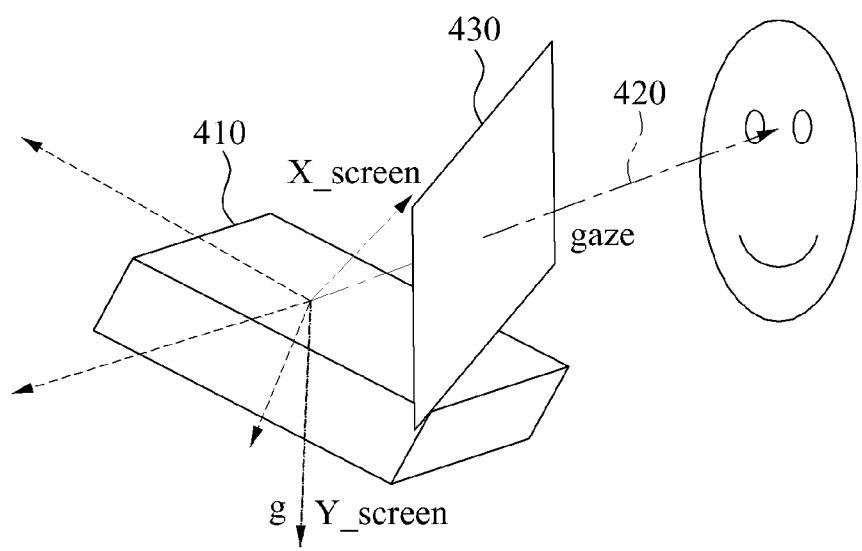

FIGS. 4A and 4B illustrate an operation of a 3D display device for displaying a 3D plane image using a gaze direction of a user according to example embodiments.

Referring to FIG. 4A, a 3D display device 410 may measure a gaze direction 420 of a user. The 3D display device 410 may generate a plane 430 orthogonal to the measured gaze direction 420. In this instance, the 3D display device 410 may calculate an x axis direction 431 and a y axis direction 432, respectively, in a form of a 3D vector.

For example, the 3D display device 410 may additionally measure a gravity direction 440. The 3D display device 410 may calculate the x axis direction 431 orthogonal to both the gravity direction 440 and the gaze direction 420, and the y axis direction 432 orthogonal to both the x axis direction 431 and the gaze direction 420.

The 3D display device 410 may display a 2D image on the plane 430 orthogonal to the gaze direction 420 of the user, thereby providing technology for enabling the user may view the front of a 2D image at all times.

Referring to FIG. 4B, the 3D display device 410 may set a y axis direction of the plane 430 to a gravity direction. In this instance, the 3D display device 410 may set an x axis direction of the plane 430 to be orthogonal to the gaze direction 420 of the user and the y axis direction, respectively.

According to example embodiments, the 3D display device 410 may calculate a 3D coordinate axis direction for displaying a 3D image, using the x axis direction and the y axis direction of the plane 430. For example, the 3D display device 410 may set an axis direction and a y axis direction of a 3D coordinate axis to the x axis direction and the y axis direction of the plane 430, respectively, and set a z axis direction of the 3D coordinate axis to the gaze direction 420 of the user.

FIG. 5 illustrates a 3D display device 500 for displaying a 3D image using a gravity direction according to example embodiments.

Referring to FIG. 5, the 3D display device 500 may include a gravity direction measuring unit 510, a data obtaining unit 520, a data transform unit 530, and a display unit 540.

The gravity direction measuring unit 510 may measure a gravity direction, and the data obtaining unit 520 may obtain image data for a 3D image.

In this instance, the data transform unit 530 may transform image data for a direction of a single axis predetermined from among coordinate axes of the 3D image to correspond to the gravity direction. For example, the data transform unit 530 may transform the image data for a z axis direction among the coordinate axes of the 3D image to correspond to the gravity direction.

The display unit 540 may display the 3D image, based on the image data transformed by the data transform unit 530.

Figure 6A:
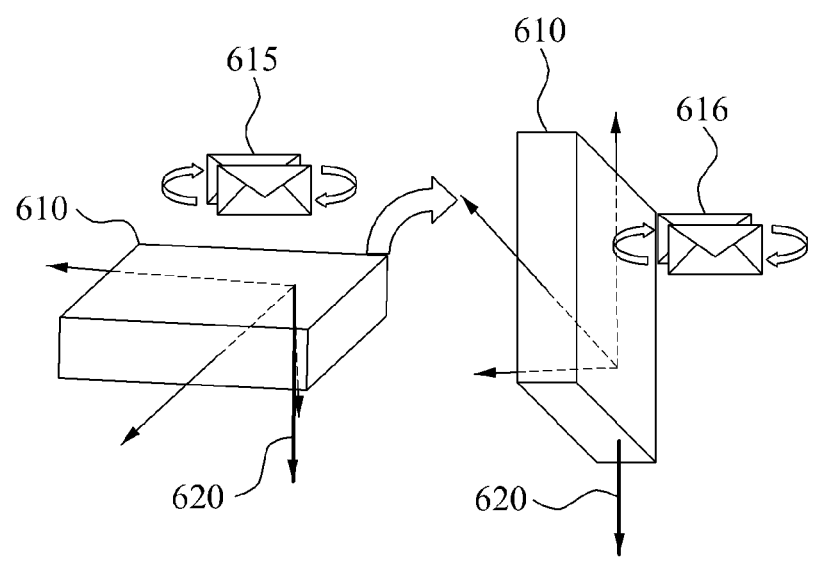
FIGS. 6A through 6D an operation of a 3D display device for displaying a 3D image using a gravity direction according to example embodiments.

For example, referring to FIG. 6A, a 3D display device 610 may transform image data for a z axis direction of a 3D image 615 to correspond to a gravity direction 620.

In this instance, the 3D display device 610 may continuously transform the image data for a z axis direction of a 3D image 616 to correspond to the gravity direction 620 although an orientation of the 3D display device 610 is changed.

Although not shown in FIG. 5, according to example embodiments, the 3D display device 500 may further include a first axis direction measuring unit.

The first axis direction measuring unit may measure a first axis direction, for example, an x axis direction, of the 3D display device 500. In this instance, the data transform unit 530 may transform image data for directions of two axes among the 3D image axes to correspond to the gravity direction and the first axis direction, respectively.

Figure 6B:
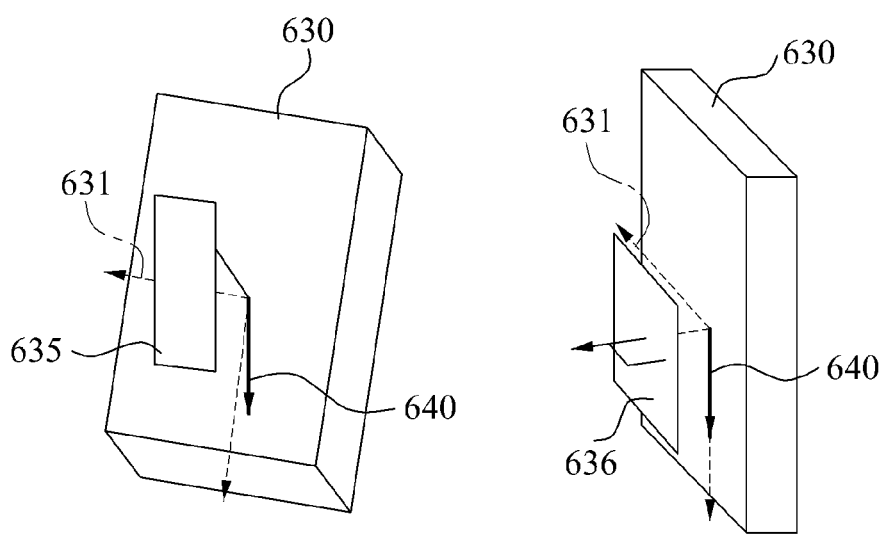

For example, referring to FIG. 6B, a 3D display device 630 may obtain directions of two axes for displaying a 3D image 635, based on a first axis direction 631 and a gravity direction 640. In particular, the 3D display apparatus 630 may set an x axis direction of the 3D image 635 to correspond to an x axis direction of the 3D display device 630, and set a z axis direction of the 3D image 635 to correspond to the gravity direction.

In this instance, the 3D display device 630 may continuously transform the image data for a z axis direction of a 3D image 636 to correspond to the gravity direction 640, and for an x axis direction of the 3D image 636 to correspond to the first axis direction 631, although an orientation of the 3D display device 630 is changed.

Accordingly, the 3D display device 630 may provide technology for displaying a 3D image, using an axis identical to an axis of an object in a real world affected by gravity. The 3D display device 630 may produce an effect of displaying a 3D volume object, such as an avatar, for example, to be viewed in a similar manner as an object existing in the real world.

Although not shown in FIG. 5, according to example embodiments, the 3D display device 500 may further include a gaze direction measuring unit, a 2D image display unit, a normal direction measuring unit, and a control unit.

The gaze direction measuring unit may measure a gaze direction of a user. The 2D image display unit may display a 2D image. The normal direction measuring unit may measure a normal direction of the 2D image display unit. The normal direction measuring unit may measure an orientation of the 3D display device 500, and measure the normal direction of the 2D image display unit based on the measured orientation of the 3D display device 500.

In this instance, the control unit may control the 2D image display unit to display a 2D image, based on the gaze direction and the normal direction. For example, the control unit may control the 2D image display unit to display the 2D image when a degree of parallelization between the gaze direction and the normal direction is less than or equal to a predetermined threshold value.

Figure 6C:
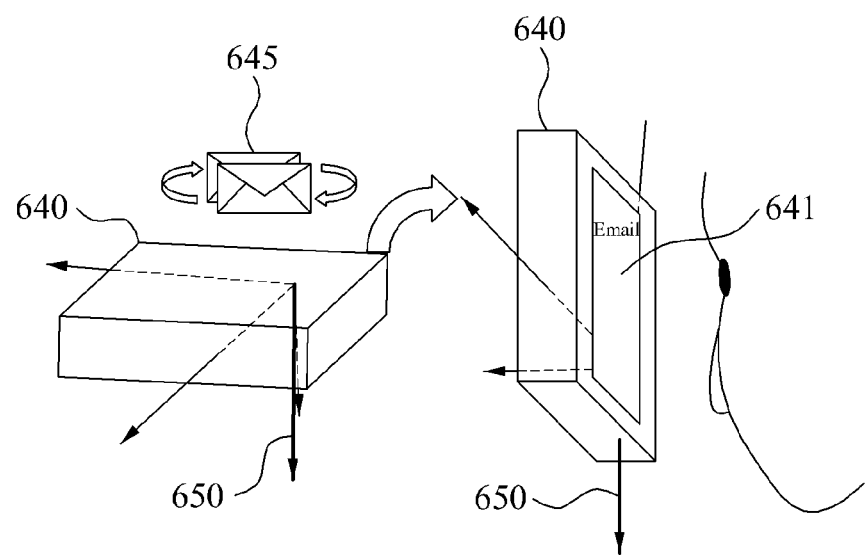

Referring to FIG. 6C, a 3D display device 640 may transform image data for a z axis direction of a 3D image 645 to correspond to a gravity direction 650. The 3D display device 640 may display the 3D image 645 based on the transformed image data, in a predetermined 3D space. Here, the 3D image 645 may include a new notification, such as a notification of a new e-mail, for example.

The 3D display device 640 may determine whether a normal direction of a 2D image display unit 641 is parallel to a gaze direction of a user, and display a 2D image on the 2D image display unit 641 based on a result of the determining. Here, the 2D image may include detailed information associated with a new notification included in the 3D image 645, such as a content of a received new e-mail, for example.

In this instance, the 3D display device 640 may control the display unit 540 to not display a 3D image when the 2D image is displayed on the 2D image display unit 641.

The 3D display device 640 may sense whether the 3D display device 640 is held by a user. In this instance, when it is sensed that the 3D display device 640 is held by the user, the 3D display device 640 may determine whether the degree of the parallelization between the gaze direction and the normal direction is less than or equal to the predetermined threshold value.

Although not shown in FIG. 5, according to example embodiments, the 3D display device 500 may include a gaze direction measuring unit, an input sensing unit, and a coordinate axis direction calculating unit.

The gaze direction measuring unit may measure a gaze direction of a user. The input sensing unit may sense an input from the user, where the input is associated with a 3D image. For example, the input from the user associated with the 3D image may be predetermined in various forms, such as an input of a handhold, or an input of shaking the 3D display device 500 twice, for example.

In this instance, when the input from the user is sensed by the input sensing unit, the coordinate axis direction calculating unit may calculate a coordinate axis direction of a 3D plane, based on a gaze direction and a gravity direction. The description provided with reference to FIG. 3 may also apply to the coordinate axis direction calculating unit.

Here, the data obtaining unit 520 may obtain 2D image data corresponding to the input from the user, and the data transform unit 530 may transform the 2D image data for a 2D image to be displayed on a 3D plane, based on a result of the calculating of the coordinate axis direction calculating unit.

Figure 6D:
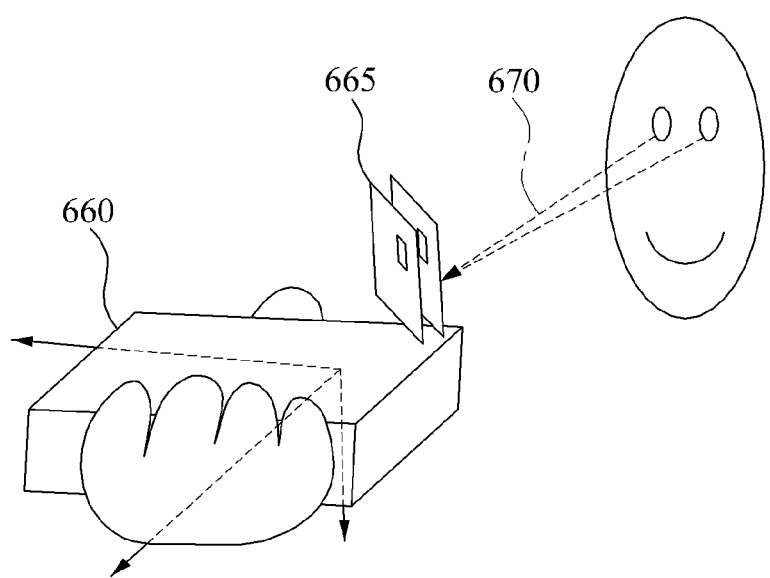

For example, referring to FIG. 6D, a 3D display device 660 may sense an input from a user, and display a 2D image corresponding to the input from the user on a 3D plane 665 orthogonal to a gaze direction 670 of the user, in response to the sensed input from the user.

FIG. 7 illustrates a 3D display device 700 for displaying a 3D image including new notification information using a gaze direction of a user, according to example embodiments.

Referring to FIG. 7, the 3D display device 700 may include a notification information receiving unit 710, a data obtaining unit 720, a gaze direction measuring unit 730, a data transform unit 740, a display unit 750, an input sensing unit 760, and a notification information display unit 770.

The notification information receiving unit 710 may receive new notification information. The data obtaining unit 720 may obtain 3D image data corresponding to the received new notification information. The gaze direction measuring unit 730 may measure a gaze direction of a user. The data transform unit 740 may transform the 3D image data based on the gaze direction of the user. The display unit 750 may display a 3D image, based on the transformed 3D image data.

For example, the 3D display device 700 may receive notification information notifying a reception of a new e-mail, and display a 3D image corresponding to the reception of the new e-mail to be viewed by the user.

Although not shown in FIG. 7, according to example embodiments, the 3D display device 700 may further include a gravity direction measuring unit, and a determination unit.

The gravity direction measuring unit may measure a gravity direction. The determination unit may determine whether a gaze direction of the user is measured by the gaze direction measuring unit 730. The data transform unit 740 may transform a 3D image data based on the gravity direction when the determination unit determines that the gaze direction is yet to be measured by the gaze direction measuring unit 730.

For example, when a gaze direction of the user is yet to be measured, although notification information notifying a reception of a new e-mail is received, the 3D display device 700 may display a 3D image corresponding to the reception of the new e-mail, based on the gravity direction.

In addition, when it is determined that the gaze direction of the user is yet to be measured, the 3D display device 700 may continuously transform 3D image data for a 3D image to be rotated on an axis corresponding to the gravity direction.

The input sensing unit 760 may sense an input from the user, the input associated with the new notification information. The notification information display unit 770 may display notification information based on a result of the sensing.

Here, the input from the user associated with the new notification information may be predetermined in various forms. For example, the input from the user may be set in various forms, for example, an input of holding the 3D display device 700 in a hand, an input of shaking the 3D display device 700 twice, an input of placing a gaze direction parallel to a normal direction of a 2D display when the notification information display unit 770 corresponds to the 2D display, and the like.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A three-dimensional (3D) display device for displaying a 3D image using a gaze direction of a user, the device comprising:
   a gaze direction measurer configured to measure the gaze direction;
   a gravity direction measurer configured to measure a gravity direction;
   a coordinate axis direction calculator configured to calculate a coordinate axis direction for displaying the 3D image, based on the gaze direction and the gravity direction, the coordinate axis direction calculator comprising
a first axis direction calculator configured to calculate a first axis direction included in the coordinate axis direction, using a cross product of a vector of the gravity direction and a vector of the gaze direction, and
a second axis direction calculator configured to calculate a second axis direction included in the coordinate axis direction, using a cross product of a vector of the first axis direction and the vector of the gaze direction;
a data obtainer configured to obtain 3D image data for the 3D image;
a viewpoint information obtainer configured to obtain information relating to a viewpoint of the 3D image;
a data transformer configured to transform the 3D image data, based on the measured gaze direction and the information relating to the viewpoint of the 3D image and the coordinate axis direction; and
a display configured to display the 3D image, based on the transformed 3D image data, on a plane defined by the first axis direction and the second axis direction.

2. The device of claim 1, wherein
the information relating to the viewpoint of the 3D image comprises a viewpoint direction in which the 3D image is set to be viewed by the user, and
the data transformer transforms the 3D image data for the gaze direction to correspond to the viewpoint direction.

3. A three-dimensional (3D) display device for displaying a 3D image comprising new notification information using a gaze direction of a user, the device comprising:
a notification information receiver configured to receive the new notification information;
a data obtainer configured to obtain 3D image data corresponding to the new notification information;
a gaze direction measurer configured to measure the gaze direction;
a gravity direction measurer configured to measure a gravity direction;
a coordinate axis direction calculator configured to calculate a coordinate axis direction for displaying the 3D image, based on the gaze direction and the gravity direction, the coordinate axis direction calculator comprising
a first axis direction calculator configured to calculate a first axis direction included in the coordinate axis direction, using a cross product of a vector of the gravity direction and a vector of the gaze direction, and
a second axis direction calculator configured to calculate a second axis direction included in the coordinate axis direction, using a cross product of a vector of the first axis direction and the vector of the gaze direction;
a data transformer configured to transform the 3D image data, based on the measured gaze direction and the coordinate axis direction;
a display configured to display the 3D image based on the transformed 3D image data, on a plane defined by the first axis direction and the second axis direction;
an input sensor configured to sense an input from the user, the input associated with the new notification information; and
a notification information display configured to display the new notification information when the input from the user is sensed by the input sensor.

4. The device of claim 3, further comprising:
a determiner configured to determine whether a gaze direction is measured by the gaze direction measurer,
wherein the data transformer transforms the 3D image data based on the gravity direction, when the determiner determines that the gaze direction is yet to be measured.

5. The device of claim 4, wherein the data transformer transforms the 3D image data for the 3D image to be rotated on an axis corresponding to the gravity direction.

6. A three-dimensional (3D) display device for displaying a 3D image using a gaze direction of a user, the device comprising:
a gaze direction measurer configured to measure the gaze direction;
a gravity direction measurer configured to measure the gravity direction;
a coordinate axis direction calculator configured to calculate a coordinate axis direction for displaying the 3D image, based on the gaze direction and the gravity direction, the coordinate axis direction calculator comprising
a first axis direction calculator configured to calculate a first axis direction included in the coordinate axis direction, using a cross product of a vector of the gravity direction and a vector of the gaze direction, and
a second axis direction calculator configured to calculate a second axis direction included in the coordinate axis direction, using a cross product of a vector of the first axis direction and the vector of the gaze direction;
a data obtainer configured to obtain image data for the 3D image;
a data transformer configured to transform the image data for a direction of a single axis predetermined from among coordinate axes of the 3D image to correspond to the gravity direction; and
a display configured to display the 3D image based on the transformed image data and the coordinate axis direction, on a plane defined by the first axis direction and the second axis direction.

7. The device of claim 6, further comprising:
a first axis direction measurer configured to measure a predetermined first axis direction included in 3D coordinate axes of the 3D display device,
wherein the data transformer transforms the image data for directions of two axes predetermined from among the coordinate axes of the 3D image to correspond to the gravity direction and the first axis direction, respectively.

8. The device of claim 6, further comprising:
a two-dimensional (2D) image display configured to display a 2D image;
a normal direction measurer configured to measure a normal direction of the 2D image display; and
a controller configured to control the 2D image display to display the 2D image based on the gaze direction and the normal direction.

9. The device of claim 8, wherein the normal direction measurer measures an orientation of the 3D display device, and measures the normal direction based on the orientation of the 3D display device.

10. The device of claim 8, wherein the controller controls the 2D image display to display the 2D image when a degree of parallelization between the gaze direction and the normal direction is less than or equal to a predetermined threshold value.

11. The device of claim 8, wherein the controller controls the display to not display the 3D image.

12. The device of claim 6, further comprising:
an input sensor configured to sense an input from the user, the input associated with the 3D image,
wherein the data obtainer obtains 2D image data corresponding to the input, and the data transformer transforms the 2D image data for a 2D image to be displayed based on the coordinate axis direction.

13. The device of claim 1, further comprising:
an image acquirer configured to acquire an image relating to the user,
wherein the gaze direction measurer estimates positions of eyes of the user from the image in order to measure the gaze direction.

14. The device of claim 1, wherein the coordinate axis direction calculator further comprises:
a third axis direction calculator configured to set a third axis direction included in the 3D coordinate axis direction to the gaze direction.

* * * * *